(No Model.)

W. R. PATTERSON.
PIPE FOR TELEGRAPH CABLES.

No. 271,262.          Patented Jan. 30, 1883.

Witnesses,
Henry Frankfurter,
F. S. Baker

Inventor,
William R. Patterson
By George H. Barton
atty

UNITED STATES PATENT OFFICE.

WILLIAM R. PATTERSON, OF CHICAGO, ILL., ASSIGNOR, BY MESNE ASSIGNMENTS, TO THE WESTERN ELECTRIC COMPANY, OF SAME PLACE.

PIPE FOR TELEGRAPH-CABLES.

SPECIFICATION forming part of Letters Patent No. 271,262, dated January 30, 1883.

Application filed June 2, 1882. (No model.)

*To all whom it may concern:*

Be it known that I, WILLIAM R. PATTERSON, a citizen of the United States, residing at Chicago, in the county of Cook and State of Illinois, have invented a certain new and useful Improvement in Pipes for Telegraph-Cables, of which the following is a full, clear, concise, and exact description, reference being had to the accompanying drawings, forming a part of this specification.

My invention relates to flexible lead pipes for protecting electrical conductors of telegraph-cables; and it consists in providing said pipes with wires, preferably of steel, which are embedded in the lead, so that the pipe may be of great tensile strength and at the same time as flexible as is necessary.

Figure 1:
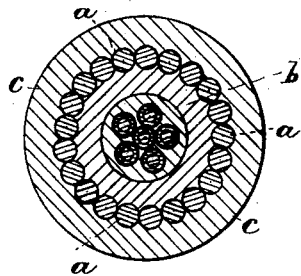
Figure 2:
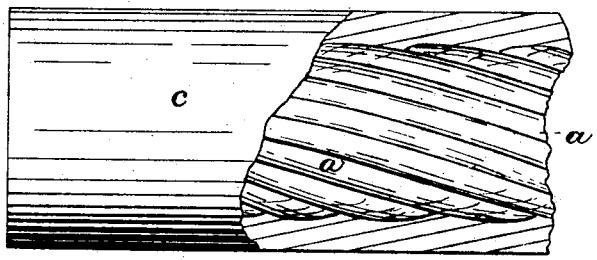
Figure 2:
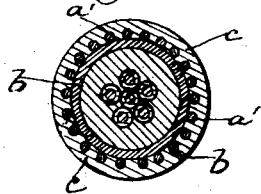

Figure 1 is a sectional view of a telegraph-cable embodying my improvement. Fig. 2 is a side elevation, showing the steel wires wound spirally about the lead pipe, as is necessary, the outer pipe being broken away. Fig. 3 is a sectional view, showing a modified form of my invention.

The core of conductors consists of wires insulated and drawn into the pipe in any of the well-known ways.

The pipe may be considered as consisting of three parts: first, the inner lead pipe; second, the wires wound spirally; and, third, the outer lead which is formed upon the wires. The inner pipe may be about one-sixteenth of one inch in thickness, with a three-quarter inch bore. The wires may be of steel and about one-twentieth of an inch in diameter. The outer lead protection formed over the wires may be about the thickness of the inner pipe—that is, about one-sixteenth of an inch.

In Fig. 1 the steel wires $a$ are shown completely covering the exterior of the inner pipe, $b$. The exterior covering, $c$, is formed over the wires, so that the wires are embedded in the lead.

A cable thus formed is of great tensile strength, while the strengthening flexible and spirally-wound wires are fully protected.

As shown in Fig. 3, a portion of the strengthening-wires may be omitted.

The spirally-wound wires $a'$ $a'$, as shown in Fig. 3, cover only a portion of the exterior surface of the inner lead pipe, $b$. The exterior lead pipe, $c$, is formed over the wires $a'$, which are thus embedded between the two pipes $b$ $c$. The two pipes $b$ $c$ and the steel wires $a'$, when thus combined, form a strong, light, and flexible protection for the core of insulated conductors.

I claim as my invention and desire to secure by Letters Patent—

1. The combination, substantially as hereinbefore set forth, of the insulated electrical conductors with the inner lead pipe, the naked spirally-wound strengthening-wires, and an exterior protection of lead formed over said naked wires.

2. The combination, substantially as hereinbefore set forth, of the core of insulated electrical conductors with the inner pipe, $b$, the spirally-wound naked steel wires $a$, covering the exterior surface of said inner pipe, and the outer covering of lead, $c$, formed over the spirally-wound naked wires.

In witness whereof I hereunto subscribe my name this 17th day of May, A. D. 1882.

WILLIAM R. PATTERSON.

Witnesses:
GEORGE P. BARTON,
F. S. BAKER.